US012768742B2

(12) United States Patent
Jeong et al.

(10) Patent No.: US 12,768,742 B2
(45) Date of Patent: Oct. 20, 2026

(54) SEAL INSPECTING DEVICE AND CONTAINER INSPECTING METHOD

(71) Applicant: SEEGENE, INC., Seoul (KR)

(72) Inventors: Won Seok Jeong, Seoul (KR); Deog Pill Cho, Seoul (KR); Yoojun Han, Seoul (KR); Hyun Jin Lim, Seoul (KR)

(73) Assignee: SEEGENE, INC., Seoul (KR)

( * ) Notice: Subject to any disclaimer, the term of this patent is extended or adjusted under 35 U.S.C. 154(b) by 147 days.

(21) Appl. No.: 18/722,149

(22) PCT Filed: Dec. 22, 2022

(86) PCT No.: PCT/KR2022/021085

§ 371 (c)(1),
(2) Date: Jun. 20, 2024

(87) PCT Pub. No.: WO2023/121352

PCT Pub. Date: Jun. 29, 2023

(65) Prior Publication Data

US 2025/0085185 A1 Mar. 13, 2025

(30) Foreign Application Priority Data

Dec. 22, 2021 (KR) ........................ 10-2021-0184801

(51) Int. Cl.
*G01M 3/38* (2006.01)
*G01N 21/90* (2006.01)

(52) U.S. Cl.
CPC .......... *G01M 3/38* (2013.01); *G01N 21/9054* (2013.01); *G01N 2201/04* (2013.01); *G01N 2201/06113* (2013.01)

(58) Field of Classification Search
CPC ...... G01M 3/38; G01M 3/36; G01N 21/9054; G01N 2201/04; G01N 2201/06113; G01N 21/90; G01N 35/00029; G01N 2035/00188
See application file for complete search history.

(56) References Cited

U.S. PATENT DOCUMENTS 6,439,032 B1 * 8/2002 Lehmann ................ G01M 3/36
73/49.3
9,274,023 B2 * 3/2016 Chevalier, Jr. .......... G01M 3/36
(Continued)

FOREIGN PATENT DOCUMENTS

DE 19703528 A1 8/1998
EP 2773936 B1 5/2021
(Continued)

OTHER PUBLICATIONS

International Search Report from corresponding PCT Application No. PCT/KR2022/021085, dated Mar. 29, 2023.
(Continued)

*Primary Examiner* — Seung C Sohn
(74) *Attorney, Agent, or Firm* — Harness, Dickey & Pierce, P.L.C.

(57) ABSTRACT

The present invention relates to a seal inspection device for inspecting seals of a container. Specifically, according to an embodiment of the present invention, provided is the seal inspection device for inspecting the sealing of a container, comprising: an irradiation unit for irradiating light along an optical path extending in a first direction; a sensor unit for detecting the light traveling along the optical path; and a pressing module for pressing the sealing of the container, wherein the pressing module includes a plurality of pressing units arranged on the optical path, and the pressing unit can be selectively located at a first position for blocking the light
(Continued)

from reaching the sensor unit and a second position for allowing the light to reach the sensor unit.

20 Claims, 10 Drawing Sheets

(56) References Cited

U.S. PATENT DOCUMENTS

| | | | | |
|---|---|---|---|---|
| 2009/0139911 | A1* | 6/2009 | Lisec | G01N 21/9072 209/617 |
| 2013/0104664 | A1* | 5/2013 | Chevalier, Jr. | G01N 3/08 73/763 |

FOREIGN PATENT DOCUMENTS

| | | | |
|---|---|---|---|
| JP | H07-286934 | A | 10/1995 |
| JP | 2000-266631 | A | 9/2000 |
| JP | 2007-149558 | A | 6/2007 |
| JP | 2010-256313 | A | 11/2010 |
| KR | 10-2012-0129942 | A | 11/2012 |
| KR | 10-2020-0014641 | A | 2/2020 |

OTHER PUBLICATIONS

Extended European Search Report from corresponding EP Patent Application No. 22911985.4, dated Oct. 7, 2025.

* cited by examiner

B - B'

SEAL INSPECTING DEVICE AND CONTAINER INSPECTING METHOD

CROSS-REFERENCE TO RELATED APPLICATIONS

This application is a national phase application of PCT Application No. PCT/KR2022/021085, filed on Dec. 22, 2022, which claims the benefit and priority to Korean Patent Application No. 10-2021-0184801, filed on Dec. 22, 2021. The entire disclosures of the applications identified in this paragraph are incorporated herein by references.

TECHNICAL FIELD

The present invention relates to a seal inspection device.

BACKGROUND ART

Recently, as people's life expectancy has been extended and interest in health has increased, the demand for gene analysis, sequence analysis, and disease diagnosis has increased. Generally, for the purpose of genetic analysis, nucleotide sequencing, and disease diagnosis, the genetic information of nucleic acids is analyzed by extracting nucleic acids from biological samples.

The sample preprocessing process, such as nucleic acid extraction, is mainly performed through automated liquid handling devices, and the reagents used for nucleic acid extraction are supplied in cartridge-type containers.

A nucleic acid extraction container has multiple chambers that can contain solutions used for nucleic acid extraction, and each chamber contains a solution for each step of the nucleic acid extraction process. Furthermore, when the solution for nucleic acid extraction is contained in each of the multiple chambers, the chambers are sealed with film or the like to prevent leakage. The container is supplied to a user by sealing each chamber and is opened and used just before being mounted on a liquid handling device.

However, the degree of sealing of each of the plurality of chambers may be different from each other, and if the seal of a particular chamber is defective, the reagent for nucleic acid extraction may leak outside the container during transportation. In addition, if the sealing of a particular chamber is defective, external substances may enter the chamber and mix with the nucleic acid extraction reagent. Accordingly, to prevent leakage or contamination of the reagents for extracting nucleic acids contained in the container, it is necessary to inspect the sealing of each chamber in the container during the process of manufacturing the container for extracting nucleic acids. However, it takes a lot of time to sequentially inspect multiple sealing points in one container. This type of inspection is not particularly suitable in the manufacturing process that require inspection of all containers produced. In addition, installing a plurality of sensors corresponding to each chamber formed in the container in the apparatus for inspecting the seal of the container may be costly and may be mechanically unfeasible if the chambers are densely packed.

Therefore, there is a need for an apparatus that can quickly and accurately inform the user whether the container are properly sealed by inspecting a plurality of chambers formed in the container.

DETAILED DESCRIPTION OF INVENTION

Technical Problems

An embodiment of the present invention is invented based on the background as described above, and is intended to provide a seal inspection device capable of accurately inspecting whether a chamber formed in a container is properly sealed.

In addition, an embodiment of the present invention is to provide a method for inspecting a sealed container capable of quickly determining whether container sealing is defective by simultaneously performing a sealing inspection on a plurality of chambers formed in the container.

Solution to the Problems

According to an aspect of the present invention, there may be provided an seal inspection device for inspecting seals of a container, comprising: an irradiation unit for irradiating light along an optical path extending in a first direction; a sensor unit for detecting the light traveling along the optical path; and a pressing module for pressing the seals of the container, wherein the pressing module comprises a plurality of pressing units disposed on the optical path, and the pressing unit is selectively located at a first position blocking the light from reaching the sensor unit and a second position allowing the light to reach the sensor unit.

In addition, there may be provided the seal inspection device further comprising a control unit configured to determine that the seal of the container is defective if the light is not detected by the sensor unit when the pressing module presses the container.

In addition, there may be provided the seal inspection device wherein the container comprises a plurality of sealed chambers, and the plurality of pressing units presses each of the plurality of sealed chambers.

In addition, there may be provided the seal inspection device wherein the plurality of pressing units are configured to be located at any one of the first position and the second position by moving independently of each other in a vertical direction.

In addition, there may be provided the seal inspection device wherein the pressing module further comprises a support body configured to movably support the pressing unit, wherein the pressing unit comprises a escape prevention part, and wherein the escape prevention part is supported by the support body when the pressing unit is located at the first position, and is spaced apart from the support body by a predetermined distance when the pressing unit is located at the second position.

In addition, there may be provided the seal inspection device wherein the pressing unit further comprises a pressing body part having a smaller width than the escape prevention part and capable of pressing the container.

In addition, there may be provided the seal inspection device wherein the support body comprises a support hole into which the pressing unit is inserted, and the escape prevention part has a width greater than a width of the support hole so as to be caught by the support body.

In addition, there may be provided the seal inspection device wherein the plurality of pressing units comprise a first pressing unit and a second pressing unit disposed adjacent to each other, and the first pressing unit and the second pressing unit comprise rotation prevention parts that engage with each other to prevent the first pressing unit and the second pressing unit from rotating.

In addition, there may be provided the seal inspection device wherein the first pressing unit comprises a first rotation prevention part extending toward the second pressing unit, wherein the second pressing unit comprises a second rotation prevention part extending toward the first pressing unit, and wherein the first rotation prevention part blocks the light when the first pressing unit is located at the first position, and wherein the second rotation prevention part blocks the light when the second pressing unit is located at the first position.

In addition, there may be provided the seal inspection device wherein the first pressing unit comprises a first protrusion protruding toward the second pressing unit, wherein the second pressing unit comprises two second protrusions protruding toward the first pressing unit and spaced apart from each other, and wherein the first pressing unit and the second pressing unit are disposed such that the first protrusion is disposed between the two second protrusions.

In addition, there may be provided the seal inspection device wherein the pressing unit comprises a blocking member configured to block the light from reaching the sensor unit when the pressing unit is located at the first position.

In addition, there may be provided the seal inspection device wherein the pressing module further comprises an elastic member configured to provide a restoring force to the pressing unit such that the pressing unit moves in a direction from the second position toward the first position.

In addition, there may be provided the seal inspection device wherein the pressing module further comprises a support body configured to movably support the pressing unit, wherein one side of the elastic member is supported by a lower portion of the support body, and the other side of the elastic member is supported by the pressing unit, and wherein the elastic member is further compressed when the pressing unit is located at the second position than when the pressing unit is located at the first position.

In addition, there may be provided the seal inspection device wherein the plurality of pressing units are arranged to be spaced apart from each other in a horizontal direction along the first direction.

In addition, there may be provided the seal inspection device wherein the plurality of pressing units are disposed on the same optical path, wherein when at least one of the plurality of pressing units is located at the first position, the light irradiated along the optical path is blocked from reaching the sensor unit, and wherein when all of the plurality of pressing units are located at the second position, the light irradiated along the optical path is allowed to reach the sensor unit.

In addition, there may be provided the seal inspection device wherein the plurality of pressing units comprise a first pressing unit and a second pressing unit disposed adjacent to each other, wherein each of the first pressing unit and the second pressing unit is provided in plurality, and wherein the irradiation unit irradiates the light such that the optical path extends between the plurality of first pressing units and the plurality of second pressing units.

In addition, there may be provided the seal inspection device wherein the plurality of pressing units are disposed between the irradiation unit and the sensor unit.

In addition, there may be provided the seal inspection device wherein the plurality of pressing units are spaced apart from each other along the first direction between the irradiation unit and the sensor unit, and are spaced apart from the optical path by a predetermined distance in a direction perpendicular to the first direction so as not to interfere with the optical path.

In addition, there may be provided the seal inspection device wherein the pressing module further comprises a support body configured to move relatively in a vertical direction with respect to the pressing unit and configured to support the pressing unit, wherein the pressing module is configured to move in the vertical direction, and wherein the plurality of pressing units are configured to be supported by the support body and configured to move in the vertical direction together with the support body.

In addition, there may be provided the seal inspection device wherein the support body is configured to move such that the plurality of pressing units apply pressure to each of the plurality of sealed chambers of the container.

In addition, there may be provided the seal inspection device wherein the light is a short-wavelength laser beam.

In addition, there may be provided a method for inspecting a sealed container, comprising: (a) a preparation step of contacting the container with a seal inspection device for inspecting seals, wherein the seal inspection device comprises: an irradiation unit for irradiating light along an optical path extending in a first direction; a sensor unit for detecting the light traveling along the optical path; and a pressing module for pressing the seals of the container, wherein the pressing module comprises a plurality of pressing units disposed on the optical path, and the pressing units is selectively located at a first position blocking the light is blocked from reaching the sensor unit and a second position allowing the light to reach the sensor unit; wherein the container comprises a chamber capable of containing a liquid substance and the chamber is sealed; (b) a pressing step of pressing the sealed chamber with the plurality of pressing units of the seal inspection device for inspecting seals; (c) a light detection step of detecting light with the sensor unit; and (d) a defect detection step of detecting defects in the container based on the light detected by the sensor unit.

In addition, there may be provided the method for inspecting a sealed container wherein the preparation step comprises contacting the plurality of pressing units with the sealing of the chamber.

In addition, there may be provided the method for inspecting a sealed container wherein the defect of the container detected in the defect detection step is a defect in the sealing of the chamber of the container.

In addition, there may be provided the method for inspecting a sealed container wherein the container comprises a plurality of sealed chambers, and wherein the plurality of pressing units respectively contact the seals of the plurality of chambers.

In addition, there may be provided the method for inspecting a sealed container wherein, in the defect detection step, the sealing of the container is detected as being defective if the sensor unit does not detect the light when the pressing module presses the container.

In addition, there may be provided the method for inspecting a sealed container wherein, in the light detection step, the sensor unit does not detect the light traveling along the optical path when at least one of the plurality of pressing units is located at the first position, and the sensor unit detects the light traveling along the optical path when all of the plurality of pressing units are located at the second position.

Effects of the Invention

An embodiment of the present invention provides the effect of accurately inspecting whether the chamber formed in the container is properly sealed.

In addition, an embodiment of the present invention provides an effect of rapidly determining the defectiveness of the container sealing by simultaneously performing a sealing inspection on a plurality of chambers formed in the container.

According to an embodiment of the present invention, it is possible to detect the sealing defect of the plurality of chambers with one sensor unit, therefore, it can also be used for inspecting containers with densely packed sealing points.

BEST MODE FOR CARRYING OUT THE INVENTION

Figure 1:
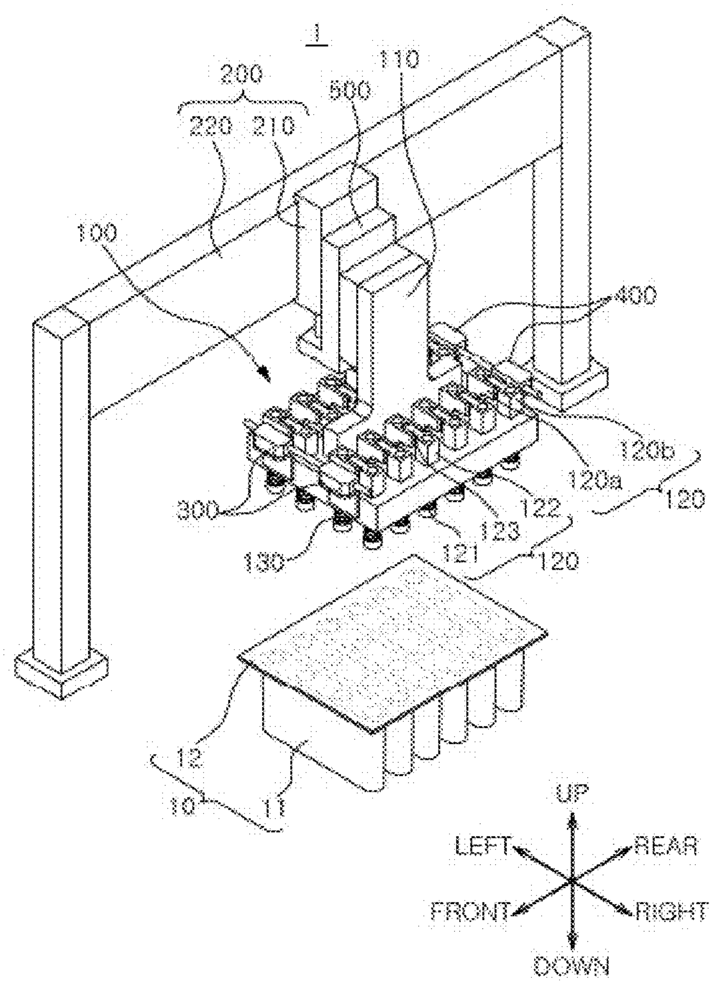
FIG. 1 is a perspective view illustrating a seal inspection device according to an embodiment of the present invention.

Hereinafter, a specific embodiment for implementing the technical idea of the present invention will be described in detail with reference to the drawings.

In addition, in describing the present invention, if it is determined that the detailed description of known structures or functions related to the present invention may unnecessarily obscure the gist of the present invention, such detailed description will be omitted.

In addition, it should be understood that when an element is referred to as being "connected" or "supported" to another element, it may be directly connected or supported by the other element, but there may also be another element in between.

The terms used in the present specification are merely used to describe specific embodiments and are not used to limit the present invention. Singular expressions include plural expressions unless the context clearly indicates otherwise.

In addition, terms including ordinal numbers such as first and second may be used to describe various components, but the components are not limited by these terms. These terms are used only for the purpose of distinguishing one component from another.

The meaning of "comprising" used in this specification specifies the presence of stated features, regions, integers, steps, operations, elements, and/or components, but does not preclude the presence or addition of other features, regions, integers, steps, operations, elements, components, and/or groups thereof.

In addition, in the present specification, the expression of directions such as an up-down direction, a left-right direction, and a front-rear direction is described based on the illustration in the drawings and may be differently expressed when the direction of the corresponding object is changed. Meanwhile, the up-down direction, the left-right direction, and the front-rear direction of the present specification may be the directions of the coordinate axes illustrated in FIG. 1.

Hereinafter, a specific configuration of the seal inspection device 1 according to an embodiment of the present invention will be described with reference to the drawings.

Hereinafter, referring to FIG. 1, the seal inspection device 1 according to an embodiment of the present invention may inspect whether the container 10 is properly sealed. In other words, the seal inspection device 1 may inspect whether the seals of container 10 is defective.

Here, the container 10 may contain a reagent for nucleic acid extraction, and may be, for example, a cartridge. Such a container 10 may be transported in a state in which a reagent for extracting nucleic acids is accommodated. In addition, the container 10 may include a chamber 11 and a film 12.

The chamber 11 may accommodate a reagent for nucleic acid extraction and may be provided in plurality. The plurality of chambers 11 may be detachably connected to each other. In addition, the plurality of chambers 11 may be sealed by the film 12 to prevent the reagents for nucleic acid extraction contained inside from leaking outside. For example, the nucleic acid extraction reagent accommodated in the chamber 11 refers to a reagent used to extract nucleic acid from a sample. The nucleic acid extraction reagent may be contained separately in each of the plurality of chambers 11. The reagent for nucleic acid extraction may include, for example, at least one of a lysis buffer for dissolving cells in a sample to expose nucleic acid, a binding buffer for binding the exposed nucleic acid molecule to a solid particle, a washing buffer that does not substantially affect binding of the solid particle to the nucleic acid molecule, and an elution buffer for separating the nucleic acid molecule from the solid particle.

As used herein, the term sample may include a biological sample (e.g., fluid from cells, tissues, and biological sources) and a non-biological sample (e.g., food, water, and soil). The biological sample may be virus, bacteria, tissue, cells, blood (e.g., whole blood, plasma, and serum), lymph, bone marrow, saliva, sputum, swab, aspirates, milk, urine, feces, ocular fluid, semen, brain extract, cerebrospinal fluid, synovial fluid, thymus fluid, bronchial lavage fluid, ascites, and amniotic fluid.

The film 12 may seal the plurality of chambers 11. For example, the film 12 may be adhered to an upper portion of the chamber 11 to seal the chamber 11, thereby blocking the inside of the chamber 11 from the outside.

In the present specification, the sealing of the container 10 is good when the film 12 is completely adhered to the upper portion of the chamber 11. In other words, the container 10 having good sealing may be understood as a state in which the inside and the outside of the chamber 11 are blocked by the film 12 and thus there is no inflow or outflow of fluid into or from the chamber 11. In this case, even if the seal inspection device 1 presses the upper portion of the film 12, the film 12 may remain attached to the chamber 11 without moving inside the chamber 11.

In addition, the defect of the container 10 means that the sealing of the container 10 is defective, and this may be a state in which the film 12 is not properly adhered to the upper portion of the chamber 11. In other words, the defective sealing of the container 10 may be understood as a state where the inside and the outside of the chamber 11 are in communication with each other and thus the fluid may flow into or out of the chamber 11. In this case, if the seal inspection device 1 presses the upper portion of the film 12, the film 12 moves inside the chamber 11.

Figure 2:
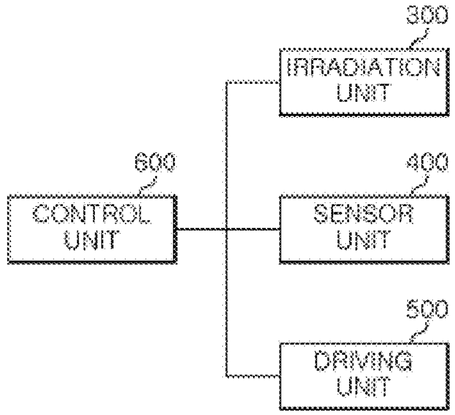
FIG. 2 is a block diagram illustrating a control unit, an irradiation unit, and a sensor unit according to an embodiment of the present invention.

Meanwhile, referring to FIGS. 1 and 2, the seal inspection device 1 may include a pressing module 100, a guide unit 200, an irradiation unit 300, a sensor unit 400, a driving unit 500, and a control unit 600.

The pressing module 100 may press the container 10 at a predetermined pressure to inspect the sealing state of the container 10. In the present specification, the pressing of the container 10 by the pressing module 100 may include pressing the upper portion of the film 12 as well as pressing the upper portions of the film 12 and the chamber 11 together. In addition, the pressing module 100 is configured to move in the vertical direction and may press the container 10 by moving downward. The pressing module 100 may include a support body 110, a pressing unit 120, and an elastic member 130.

Referring to FIGS. 1 and 3 to 8, the support body 110 may movably support the pressing unit 120. The support body 110 is supported by the guide unit 200, and may be guided by the guide unit 200 to move in the vertical direction and/or the front-rear direction. For example, the support body 110 may be moved in the vertical direction by the driving unit 500. In addition, the support body 110 may move along the vertical direction while supporting the pressing unit 120. The support body 110 may be provided with a support hole 111 through which the pressing unit 120 may pass. The pressing unit 120 may be inserted into the support hole 111. In addition, a plurality of support holes 111 may be provided, and a plurality of pressing units 120 may be inserted into each of the plurality of support holes 111. For example, the support hole 111 may be formed to pass through the support body 110 in the vertical direction, and may have a predetermined width.

The pressing unit 120 may press the container 10 with a predetermined pressure. In addition, the pressing unit 120 may be supported by the support body 110 to be relatively movable in the vertical direction with respect to the support body 110. For example, the pressing unit 120 may descend together with the support body 110 while being supported by the support body 110. After the pressing unit 120 directly or indirectly contacts the container 10, if the support body 110 descends further, the pressure is applied to the sealed chamber 11 of the container 10 by the pressing unit 120. The pressing unit 120 may ascend relatively with respect to the support body 110 when pressing the container 10. The pressing unit 120 may be alternatively positioned at the first position and the second position. In other words, the pressing unit 120 may be located at any one of the first position and the second position.

The support body 110 may be configured to move such that the plurality of pressing units 120 apply pressure to each of the plurality of sealed chambers 11 of the container 10. Here, the pressure applied to each of the plurality of sealed chambers 11 may be the same. To this end, the plurality of pressing units 120 may be disposed such that lower surfaces of the plurality of pressing units 120 are positioned at the same height when the pressing units 120 are not pressing the container 10. However, the pressures applied to the plurality of chambers 11 by the plurality of pressing units 120 may be different from each other depending on the sealing state of the plurality of chambers 11. In addition, the support body 110 may be configured such that the plurality of pressing units 120 simultaneously apply pressure to the plurality of sealed chambers 11 of the container 10. Specifically, the support body 110 may be configured such that the elastic member 130 may move to provide the same restoring force to the respective pressing units 120 by the movement of the support body 110.

Figure 3:
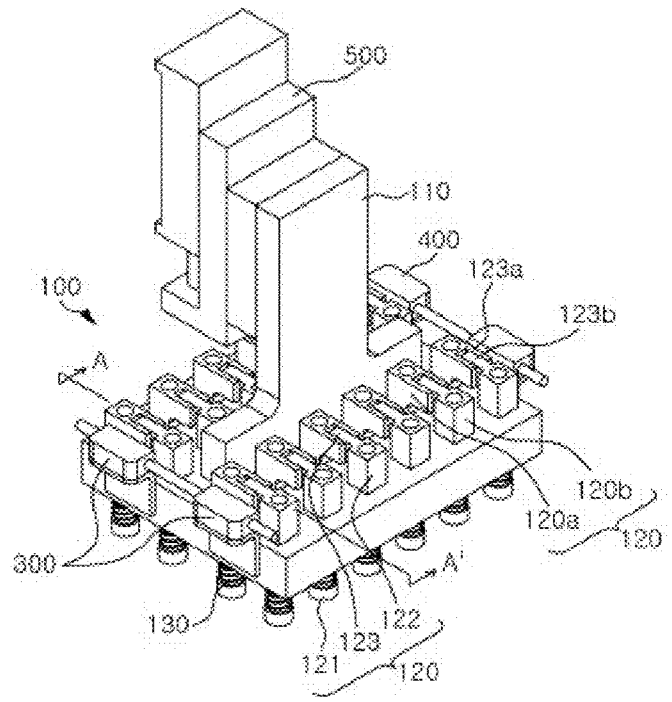
FIG. 3 is a partial perspective view of the seal inspection device with the pressing unit in the first position according to FIG. 1.
Figure 4:
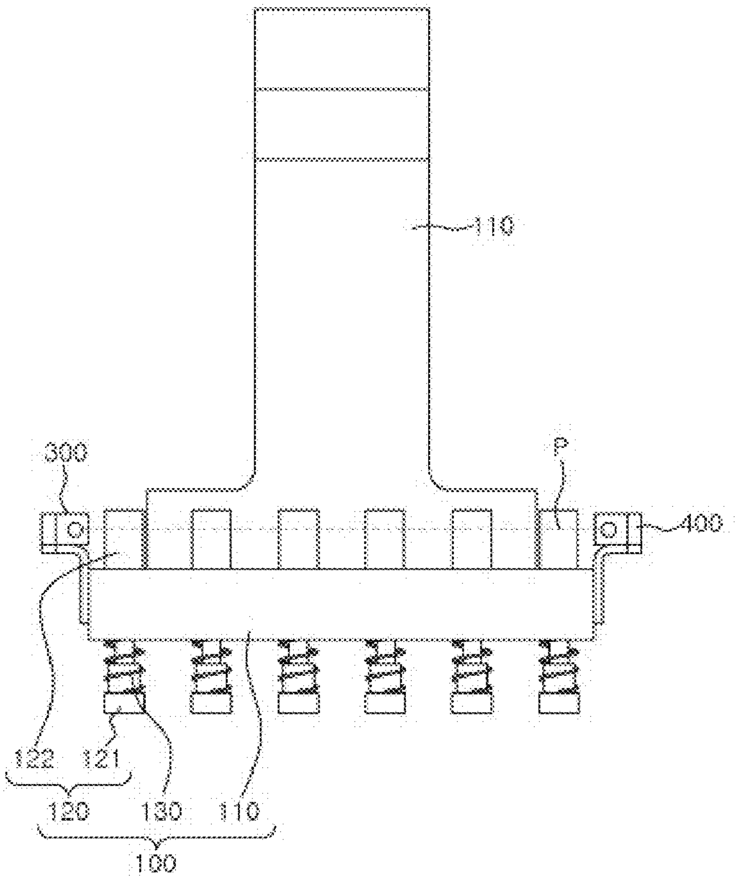
FIG. 4 is a side view of FIG. 3.
Figure 5:
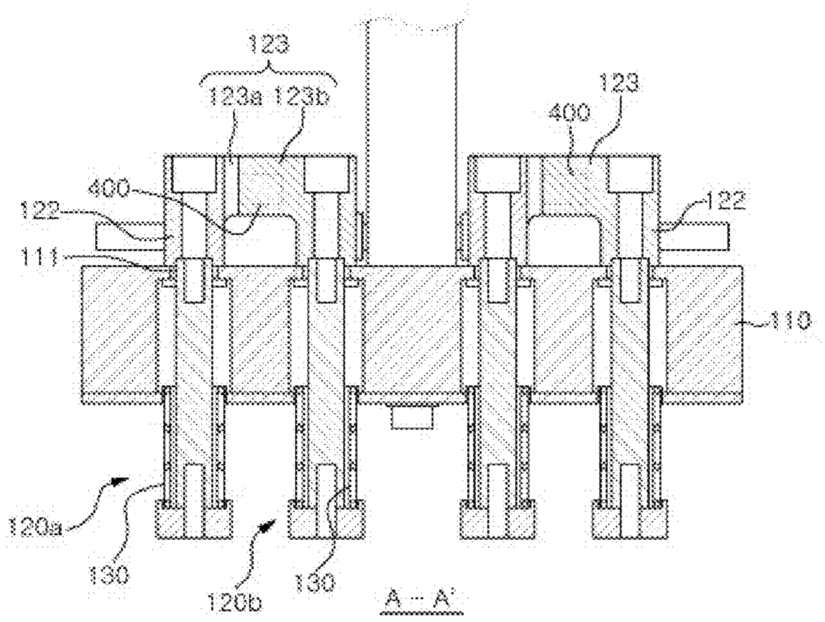
FIG. 5 is a longitudinal cross-sectional view taken along line A-A' of FIG. 3.

Referring to FIGS. 3 to 5, in this specification, the first position of the pressing unit 120 is a position in which the pressing unit 120 is disposed on an optical path to be described later to block light from reaching the sensor unit 400. In this case, the pressing unit 120 may be disposed on the path of the light irradiated from the irradiation unit 300 to block the light from reaching the sensor unit 400. The pressing unit 120 may be placed in the first position when the seal of the chamber 11 being pressed is defective. In addition, when the pressing unit 120 is placed in the first position, one side of the pressing unit 120 may be supported by the support body 110.

Figure 6:
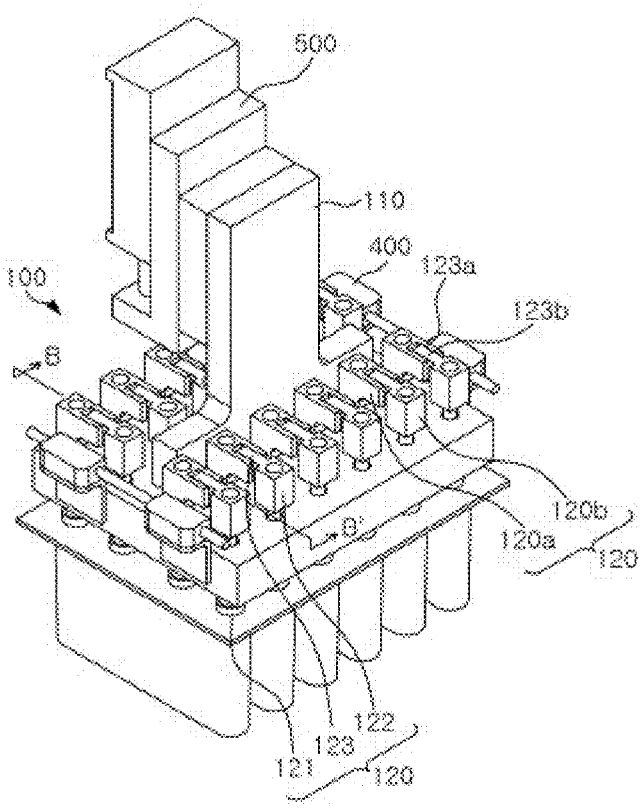
FIG. 6 is a partial perspective view of the seal inspection device with the pressing unit in the second position according to FIG. 1.
Figure 7:
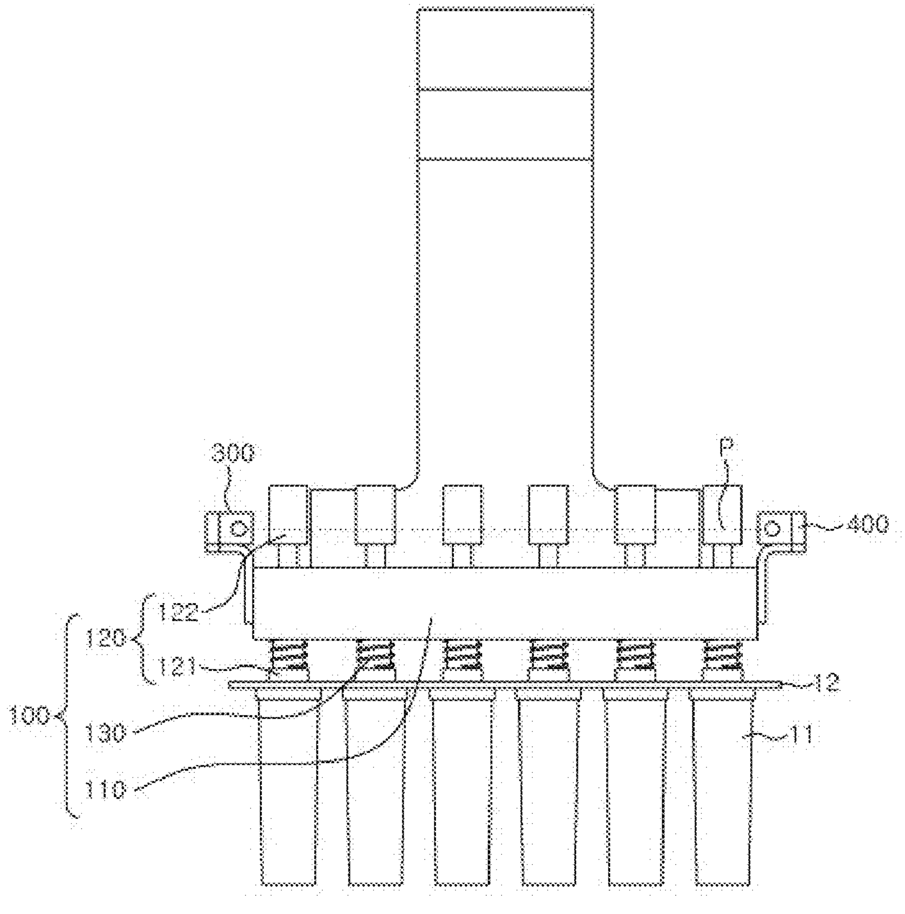
FIG. 7 is a side view of FIG. 6.
Figure 8:
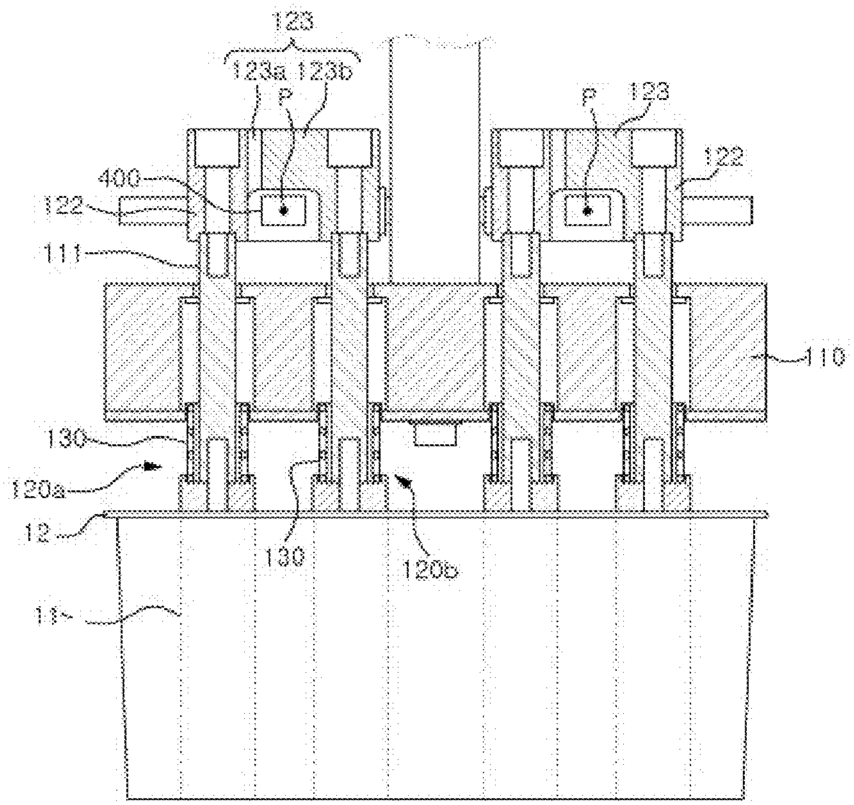
FIG. 8 is a longitudinal cross-sectional view taken along line B-B' of FIG. 6.

Referring to FIGS. 6 to 8, the second position of the pressing unit 120 is a position where the pressing unit 120 is removed from the optical path, allowing light to reach the sensor unit 400. In this case, the pressing unit 120 may deviate from the path of the light irradiated from the irradiation unit 300, allowing the light to reach the sensor unit 400. This pressing unit 120 may be placed in the second position when the seal of the chamber 11 being pressed is in good condition. In addition, when the pressing unit 120 is placed in the second position, one side of the pressing unit 120 may be spaced apart from the support body 110 by a predetermined distance.

Figure 9:
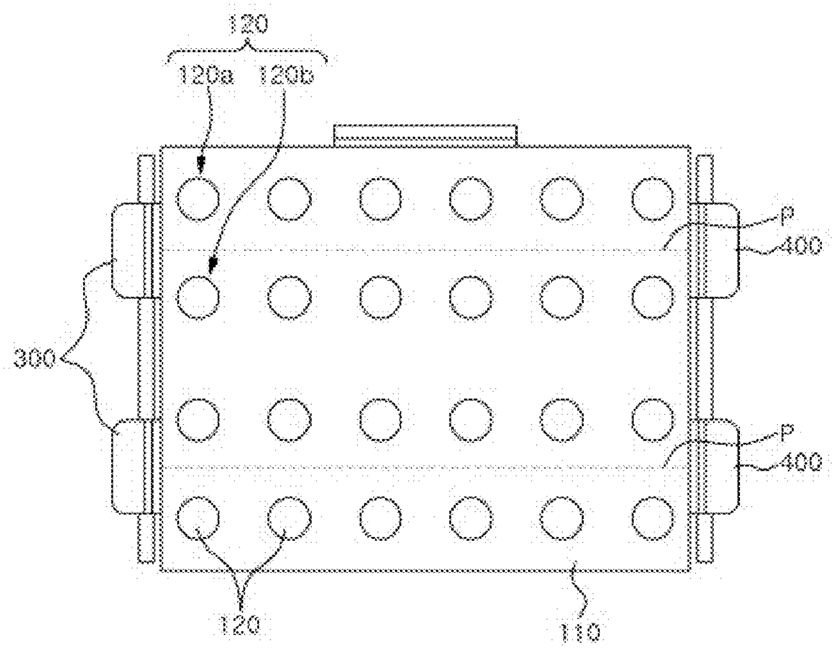
FIG. 9 is a bottom view of FIG. 6.

In addition, referring to FIG. 9, a plurality of pressing units 120 may be provided, and the plurality of pressing units 120 may be arranged to be spaced apart from each other along the front and rear direction and the left and right direction. Such a plurality of pressing units 120 may simultaneously descend in response to the descent of the support body 110. In addition, the plurality of pressing units 120 may move independently in the vertical direction with respect to the support body 110. Here, the independent movement of the plurality of pressing units 120 means that the plurality of pressing units 120 move individually without affecting each other's movement. For example, the plurality of pressing units 120 may be selectively placed at the first position and the second position independently according to the sealing condition of the chamber 11 being pressed. In this case, the pressing unit 120 that presses a particular chamber 11 having defective seal may be placed at the first position, and the pressing unit 120 that presses the remaining chamber 11 having good seal may be placed at the second position.

According to an embodiment, the plurality of pressing units 120 may be disposed to be spaced apart from each other along the first direction between the irradiation unit 300 and the sensor unit 400. Here, the first direction (P) refers to an extension direction of the optical path. In this case, the plurality of pressing units 120*a* and 120*b* may be spaced apart from each other by a predetermined distance in a direction perpendicular to the first direction so as not to interfere with the optical path. With such an arrangement, it is possible to effectively inspect the seal of the plurality of chambers 11 of the cartridge using a minimum combination of the irradiation unit 300 and the sensor unit 400.

Referring again to FIG. 3, the plurality of pressing units 120 may include a first pressing unit 120*a* and a second pressing unit 120*b*. The first pressing unit 120*a* and the second pressing unit 120*b* may be disposed adjacent to each other in the left-right direction. In addition, the first pressing unit 120*a* and the second pressing unit 120*b* may be engaged with each other to prevent them from being rotated around the vertical direction.

Each of the plurality of pressing units 120 may include a pressing body part 121, an escape prevention part 122, and a rotation prevention part 123.

The pressing body part 121 may selectively press the container 10. The pressing body part 121 may have one side connected to the escape prevention part 122 and the other side selectively pressing the container 10. The pressing body part 121 may have a smaller width than the escape prevention part 122. One side of the pressing body part 121 connected to the escape prevention part 122 has a width smaller than that of the support hole 111, and the other side pressing the container 10 has a width larger than that of the support hole 111. In this case, the pressing body part 121 may pass through the support hole 111 and move in the vertical direction.

Referring again to FIGS. 4 and 7, the escape prevention part 122 may be selectively engage with the support body 110 to prevent the pressing body part 121 from being separated from the support body 110. In other words, the escape prevention part 122 may prevent the pressing body part 121 from excessively descending relative to the support body 110 by catching onto the support body 110. The escape prevention part 122 is supported by the support body 110 when the pressing unit 120 is in the first position, and is spaced apart from the support body 110 by a predetermined distance when the pressing unit 120 is placed at the second position. For example, the escape prevention part 122 may be caught by the support body 110 when the pressing unit 120 is placed at the first position. As another example, the escape prevention part 122 may be spaced upward from the support body 110 when the pressing unit 120 is placed at the second position. The escape prevention part 122 may have a larger width than the pressing body part 121 and the support hole 111.

The rotation prevention part 123 may be engaged with the rotation prevention part 123 of the adjacent pressing unit 120 to prevent the pressing unit 120 from being rotated around a direction (for example, an up-down direction) in which the container 10 is pressed. In addition, the rotation prevention part 123 of the first pressing unit 120*a* may be referred to as a first rotation prevention part 123*a*, and the rotation prevention part 123 of the second pressing unit 120*b* may be referred to as a second rotation prevention part 123*b*.

The first rotation prevention part 123*a* and the second rotation prevention part 123*b* may be engaged with each other to prevent the first pressing unit 120*a* and the second pressing unit 120*b* from being rotated. The rotation may be about a direction in which the first pressing unit 120*a* and the second pressing unit 120*b* press the container 10 (e.g., up and down directions of FIG. 2), respectively. The first rotation prevention part 123*a* may protrude from the escape prevention part 122 of the first pressing unit 120*a* and may extend toward the second pressing unit 120*b*. In addition, the second rotation prevention part 123*b* may protrude from the escape prevention part 122 of the second pressing unit 120*b*, and the second rotation prevention part 123*b* may extend toward the first pressing unit 120*a*.

In addition, one of the first rotation prevention part 123*a* and the second rotation prevention part 123*b* may be provided to surround the other. For example, the second rotation prevention part 123*b* may have a shape surrounding the first rotation prevention part 123*a* when the first pressing unit 120*a* and the second pressing unit 120*b* are placed in the second position. As a more detailed example, the first rotation prevention part 123*a* may be provided as a single part, while the second rotation prevention part 123*b* may be provided as two parts spaced apart from each other. In this case, one first rotation prevention part 123*a* may be positioned between the two second rotation prevention parts 123*b*.

The pressing unit 120 of the present invention may include a blocking member that blocks light from reaching the sensor unit 400 when the pressing unit 120 is located at the first position. When the pressing unit 120 is located at the first position, the blocking member may be disposed on the optical path to block light from reaching the sensor unit 400. In addition, the blocking member may allow light to reach the sensor unit 400 when the pressing unit 120 is located at the second position.

According to an embodiment, the rotation prevention part 123 may be referred to as a blocking member. Specifically, the first rotation prevention part 123*a* and the second rotation prevention part 123*b* may selectively block light traveling along an optical path. For example, when the first pressing unit 120*a* is located at the first position, the first rotation prevention part 123*a* may be disposed on the optical path to block light from reaching the sensor unit 400 (see FIG. 5). In addition, when the second pressing unit 120*b* is located at the first position, the second rotation prevention part 123*b* may be disposed on the optical path to prevent light from reaching the sensor unit 400 (see FIG. 5). As another example, when the first pressing unit 120*a* and the second pressing unit 120*b* are placed together at the second position, the first rotation prevention part 123*a* and the second rotation prevention part 123*b* may allow light to reach the sensor unit 400 (see FIG. 8).

As described above, the pressing unit of the present invention is configured such that single structure prevents rotation of the pressing unit and blocks light when the seal is defective.

In addition, the first rotation prevention part 123*a* may be referred to as a first protrusion protruding toward the second pressing unit 120*b*, and the second rotation prevention part 123*b* may be referred to as a second protrusion protruding toward the first pressing unit 120*a*.

The elastic member 130 may provide a restoring force to the pressing unit 120 such that the pressing unit 120 moves in a direction from the second position toward the first position. The elastic member 130 may have one side supported by the lower portion of the support body 110 and the other side supported by the pressing unit 120. In addition, the elastic member 130 may be disposed to surround at least a portion of the pressing body part 121. For example, the elastic member 130 may be further compressed when the pressing unit 120 is placed in the second position than when it is placed in the first position. In this case, the elastic member 130 may provide a restoring force to the pressing unit 120 so that the pressing unit 120 is moved from the second position to the first position. The elastic member 130 may be provided in plurality and may be provided to each of the plurality of pressing units 120.

The guide unit 200 may guide the movement of the pressing module 100. The guide unit 200 may include a first guide 210 and a second guide 220. The first guide 210 may extend in the vertical direction and may guide the pressing module 100 in the vertical direction. In addition, the second guide 220 may extend in the front-rear direction and guide the pressing module 100 in the front-rear direction. For example, the first guide 210 and the second guide 220 may be provided in a rail shape so that the pressing module 100 is slidably supported.

The irradiation unit 300 may irradiate light along an optical path extending in the front-rear direction. In the present specification, the optical path refers to a path through which the light irradiated from the irradiation unit 300 travels, and may be, for example, a virtual straight line extending along the front-rear direction. The irradiation unit 300 may be supported by the support body 110 and disposed between the first pressing unit 120*a* and the second pressing unit 120*b* in the left-right direction. In other words, the irradiation unit 300 may irradiate the light such that the light path extends between the first pressing unit 120*a* and the second pressing unit 120*b*. In this case, when at least one of the first pressing unit 120*a* and the second pressing unit 120*b* is located at the first position, the light irradiated to the irradiation unit 300 may not reach the sensor unit 400 and may be blocked.

Meanwhile, the plurality of first pressing units 120*a* and the second pressing units 120*b* may be disposed on the left and right sides of the optical path, respectively. In other words, each of the first pressing unit 120*a* and the second pressing unit 120*b* may be provided in plurality, and the irradiation unit 300 may irradiate light such that a light path extends between the plurality of first pressing units 120*a* and the plurality of second pressing units 120*b*. In this case, if any one of the plurality of first pressing units 120*a* and the second pressing unit 120*b* is located at the first position, the light path may be blocked. In addition, when all of the plurality of first pressing units 120*a* and the second pressing units 120*b* are located at the second position, the light path may not be blocked, and the light may travel along the light path. The light irradiated from the irradiation unit 300 may be, for example, a short-wavelength laser beam. In addition, a plurality of irradiation units 300 may be provided, and the plurality of irradiation units 300 may be spaced apart in the left-right direction. In this case, a plurality of optical paths may be formed on the left and right sides, respectively.

The sensor unit 400 may detect light traveling along an optical path, and may generate a signal. In addition, the sensor unit 400 may transmit the generated signal to the control unit 600. The sensor unit 400 may be disposed on the optical path to detect the light irradiated from the irradiation unit 300. For example, when at least one of the plurality of pressing units 120 is located at the first position, the light traveling along the light path is blocked by the pressing unit 120 and thus does not reach the sensor unit 400. In this case, the sensor unit 400 does not detect light. As another example, when the plurality of pressing units 120 are placed at the second position, the light traveling along the light path reaches the sensor unit 400. In this case, the sensor unit 400 may detect light. To this end, the plurality of pressing units 120 may be disposed between the irradiation unit 300 and the sensor unit 400 when viewed from above (see FIG. 9).

Meanwhile, a plurality of sensor units 400 may be provided, and the plurality of sensor units 400 may be disposed corresponding to the plurality of irradiation units 300. In other words, the plurality of sensor units 400 may be disposed on the plurality of optical paths, respectively. The sensor unit 400 may be supported by the support body 110.

The driving unit 500 may move the support body 110 in the vertical direction along the first guide 210. In addition, the driving unit 500 may move the first guide 210 in the front-rear direction along the second guide 220. The driving unit 500 may include a plurality of actuators.

The control unit 600 may control operations of the irradiation unit 300 and the driving unit 500. In addition, the control unit 600 may determine whether the seal of the container 10 is defective or good based on the signal received from the sensor unit 400. For example, when the pressing module 100 presses the container 10 and light is not detected by the sensor unit 400, the control unit 600 may determine that the seal of the container 10 is defective. The control unit 600 may be implemented by computing device including a microprocessor, measuring devices such as sensors, and memory, and the implementation method is obvious to those skilled in the art, so a detailed explanation is omitted.

Hereinafter, the operation and effect of the seal inspection device 1 according to an embodiment of the present invention will be described.

The seal inspection device 1 may press the container 10 to determine whether the seal of the container 10 is good or defective. For example, when the container 10 is placed under the seal inspection device 1, the pressing module 100 may descend toward the container 10. During the descent of the pressing module 100, the pressing unit 120 may be located at the first position. Then, while the pressing module 100 presses the container 10, the pressing unit 120 may be in either the first position or the second position.

For example, if the seal of one chamber 11 of the plurality of chambers 11 formed in the container 10 is defective, the pressing unit 120 pressing the chamber 11 with defective seal may descend relative to the support body 110. That is, the pressing unit 120 that presses the chamber 11 having defective seal may move into the chamber 11. In this case, the pressing unit 120 that presses the chamber 11 with defective seal may be located at the first position, and the light irradiated from the irradiation unit 300 may be blocked by the pressing unit 120 placed at the first position. In addition, light is not detected by the sensor unit 400, and the control unit 600 may determine that the seal of the container 10 is defective.

As another example, when all of the plurality of chambers 11 formed in the container 10 are well sealed, the plurality of pressing units 120 pressurizing the plurality of chambers 11 may be supported by the container 10 without being lowered. That is, the plurality of pressing units 120 may not move toward the inside of the chamber 11 and may be supported by the container 10 in a state in which the film 12 of the container 10 is pressed with a predetermined pressure. In this case, all of the plurality of pressing units 120 are located at the second position, and the light irradiated from the irradiation unit 300 may travel toward the sensor unit 400 without being blocked by the pressing unit 120. In addition, light is detected by the sensor unit 400, and the control unit 600 may determine that the seal of the container 10 is good.

The seal inspection device 1 may press the film 12 of the chamber 11 simultaneously with the plurality of pressing units 120 correspond, and inspect the sealing defects of the plurality of chambers 11 simultaneously. In this case, a plurality of chambers 11 may be inspected at once, minimizing the time required for inspection.

In addition, when simultaneously pressing the container 10, the plurality of pressing units 120 may move independently of each other, thereby allowing for the individual inspection of sealing detects in the plurality of chambers 11. In this case, it is possible to improve the accuracy of the sealing defect inspection of the container 10 by inspecting each of the plurality of chambers 11 for defects.

Meanwhile, the seal inspection device 1 may detect the positions of the plurality of pressing units 120 with just a pair of the irradiation unit 300 and the sensor unit 400, without installing the irradiation unit 300 and the sensor unit 400 for each of the plurality of pressing units 120. In this case, the number of the irradiation unit 300 and the sensor unit 400 is minimized, so that there is an effect of reducing costs.

In addition, since the irradiation unit 300 and the sensor unit 400 are not installed in each of the plurality of pressing units 120, the plurality of pressing units 120 may be arranged at adjacent positions. In this case, there is an effect that the volume of the pressing module 100 is minimized.

Figure 10:
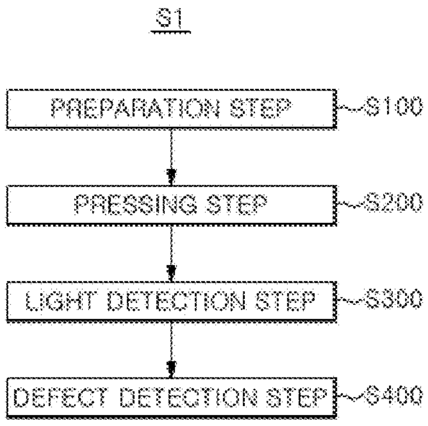
FIG. 10 is a flowchart sequentially showing the method for inspecting a container using the seal inspection device according to an embodiment of the present invention.

Hereinafter, with reference to FIG. 10, the method for inspecting a sealed container S1 using the seal inspection device 1 according to an embodiment of the present invention will be described.

The method for inspecting a sealed container S1 may inspect whether the container 10 is properly sealed. For example, the method for inspecting a sealed container S1 may inspect whether the container 10 is defective in sealing using the seal inspection device 1 described above. The method for inspecting a sealed container S1 may include a preparation step S100, a pressing step S200, a light detection step S300, and a defect detection step S400.

In the preparation step S100, the container 10 may be prepared so that the seal inspection device 1 is located on the sealed container 10. In this preparation step (S100), the seal inspection device 1 may contact the upper portion of the container 10. For example, in the preparation step S100, the plurality of pressing units 120 may contact the plurality of sealed chambers 11, respectively. In addition, the plurality of pressing units 120 may be placed at the first position before the pressing step S200.

In the pressing step S200, the plurality of pressing units 120 may press the plurality of sealed chambers 11, respectively. In the pressing step S200, the plurality of pressing units 120 may independently move in the vertical direction to press the plurality of chambers 11, respectively.

In this pressing step S200, a plurality of pressing units 120 may be placed in either the first position or the second position. For example, in the pressing step S200, the pressing unit 120 is placed at the first position when the seal of the chamber 11 is defective. In this case, the blocking member of the pressing unit 120 is placed on the optical path to block the light traveling along the optical path from reaching the sensor unit 400. In another example, in the pressing step S200, the pressing unit 120 is placed at the second position when the seal of the chamber 11 is good. In this case, the blocking member 123 of the pressing unit 120 may be out of the optical path, allowing the light traveling along the optical path to reach the sensor unit 400.

In the light detection step S300, the sensor unit 400 may detect the light irradiated from the irradiation unit 300. In other words, the light detection step S300 may detect light that is irradiated from the irradiation unit 300 and travels along the optical path.

In the light detection step S300, when at least one pressing unit 120 of the plurality of pressing units 120 is placed at the first position, the sensor unit 400 cannot detect light traveling along the optical path. For example, when any one of the seals of the plurality of chambers 11 is defective, the pressing unit 120 that presses the chamber 11 with defective seal in the pressing step S200 is located at the first position. In this case, the light path is blocked by the pressing unit 120, and the sensor unit 400 cannot detect the light traveling along the light path.

In addition, in the light detection step S300, when all of the plurality of pressing units 120 are located at the second position, the sensor unit 400 detects light traveling along the light path. For example, if the seals of all the plurality of chambers 11 are good, the pressing unit 120 pressing the plurality of chambers 11 in the pressurizing step S200 is located at the second position. In this case, the optical path does not interfere with the pressing unit 120, and the sensor unit 400 detects light traveling along the optical path.

In the defect detection step S400, the control unit 600 may detect whether the seal of the container 10 is defective based on the amount of light detected by the sensor unit 400. For example, if any one of the seals of the plurality of chambers 11 is defective, the sensor unit 400 cannot detect light traveling along the optical path. In this case, in the defect detection step S400, the control unit 600 determines that the seal of the container 10 is defective. As another example, if the seals of all the plurality of chambers 11 are good, the sensor unit 400 detects light traveling along the optical path. In this case, in the defect detection step S400, the control unit 600 determines that the seal of the container 10 is good.

Although the embodiments of the present invention have been described as specific embodiments, this is merely an example, and the present invention is not limited thereto, and should be interpreted as having the broadest range according to the technical spirit disclosed in the present specification. Those skilled in the art may combine/substitute the disclosed embodiments to implement a pattern having an unindicated shape, but this is also within the scope of the present invention. In addition, those skilled in the art may easily change or modify the embodiments disclosed based on the present specification, and it is clear that such change or modification also falls within the scope of the present invention.

EXPLANATION OF SYMBOLS

1: Seal inspection device
10: Container
11: Chamber
12: Film
100: Pressing module
110: Support body
111: Support hole
120: Pressing unit
120a: First pressing unit
120b: Second pressing unit
121: Pressing body part
122: Escape prevention part
123: Rotation prevention part
123a: First rotation prevention part
123b: Second rotation prevention part
130: Elastic member
200: Guide unit
210: First guide
220: Second guide
300: Irradiation unit
400: Sensor unit
500: Driving unit
600: Control unit

What is claimed is:

1. A seal inspection device for inspecting seals of a container, comprising:
- an irradiation unit for irradiating light along an optical path extending in a first direction;
- a sensor unit for detecting the light traveling along the optical path; and
- a pressing module for pressing seals of the container,
- wherein the pressing module comprises a plurality of pressing units disposed on the optical path, and each of the plurality of pressing units is selectively located at a first position blocking the light from reaching the sensor unit and a second position allowing the light to reach the sensor unit.

2. The seal inspection device of claim 1, further comprising a control unit configured to determine that at least one of the seals of the container is defective if the light is not detected by the sensor unit when the pressing module presses the seals of the container.

3. The seal inspection device of claim 1, wherein the container comprises a plurality of sealed chambers, and the plurality of pressing units presses each of the plurality of sealed chambers.

4. The seal inspection device of claim 1, wherein the plurality of pressing units are configured to be located at any one of the first position and the second position by moving independently of each other in a vertical direction.

5. The seal inspection device of claim 1, wherein the pressing module further comprises a support body configured to movably support each of the plurality of pressing units, wherein each of the plurality of pressing units comprises an escape prevention part, and wherein the escape prevention part is supported by the support body when the respective pressing unit is located at the first position, and is spaced apart from the support body by a predetermined distance when the respective pressing unit is located at the second position.

6. The seal inspection device of claim 5, wherein the support body is configured to move such that the plurality of pressing units apply pressure to each of a plurality of sealed chambers of the container.

7. The seal inspection device of claim 1, wherein the plurality of pressing units are disposed on the same optical path, wherein when at least one of the plurality of pressing units is located at the first position, the light irradiated along the optical path is blocked from reaching the sensor unit, and wherein when all of the plurality of pressing units are located at the second position, the light irradiated along the optical path is allowed to reach the sensor unit.

8. The seal inspection device of claim 1, wherein the pressing module further comprises a support body configured to move relatively in a vertical direction with respect to the plurality of pressing units and configured to support the plurality of pressing units, wherein the pressing module is configured to move in the vertical direction, and wherein the plurality of pressing units are configured to be supported by the support body and configured to move in the vertical direction together with the support body.

9. The seal inspection device of claim 1, wherein the plurality of pressing units comprise a first pressing unit and a second pressing unit disposed adjacent to each other, and the first pressing unit and the second pressing unit comprise rotation prevention parts that engage with each other to prevent the first pressing unit and the second pressing unit from rotating.

10. The seal inspection device of claim 9, wherein the first pressing unit comprises a first rotation prevention part extending toward the second pressing unit, wherein the second pressing unit comprises a second rotation prevention part extending toward the first pressing unit, and wherein the first rotation prevention part blocks the light when the first pressing unit is located at the first position, and wherein the second rotation prevention part blocks the light when the second pressing unit is located at the first position.

11. The seal inspection device of claim 1, wherein each of the plurality of pressing units comprises a blocking member configured to block the light from reaching the sensor unit when the respective pressing unit is located at the first position.

12. The seal inspection device of claim 1, wherein the pressing module further comprises an elastic member configured to provide a restoring force to the pressing unit such that the pressing unit moves in a direction from the second position toward the first position.

13. The seal inspection device of claim 12, wherein the pressing module further comprises a support body configured to movably support the pressing unit, wherein one side of the elastic member is supported by a lower portion of the support body, and the other side of the elastic member is supported by the pressing unit, and wherein the elastic member is further compressed when the pressing unit is located at the second position than when the pressing unit is located at the first position.

14. The seal inspection device of claim 1, wherein the plurality of pressing units are arranged to be spaced apart from each other in a horizontal direction along the first direction.

15. The seal inspection device of claim 14, wherein the plurality of pressing units comprise a first pressing unit and a second pressing unit disposed adjacent to each other, wherein each of the first pressing unit and the second pressing unit is provided in plurality, and wherein the irradiation unit irradiates the light such that the optical path extends between the plurality of first pressing units and the plurality of second pressing units.

16. The seal inspection device of claim 14, wherein the plurality of pressing units are disposed between the irradiation unit and the sensor unit.

17. The seal inspection device of claim 14, wherein the plurality of pressing units are spaced apart from each other along the first direction between the irradiation unit and the sensor unit, and are spaced apart from the optical path by a predetermined distance in a direction perpendicular to the first direction so as not to interfere with the optical path.

18. A method for inspecting a sealed container, comprising:

(a) a preparation step of contacting a container with a seal inspection device for inspecting seals, wherein the seal inspection device comprises:

an irradiation unit for irradiating light along an optical path extending in a first direction;

a sensor unit for detecting the light traveling along the optical path; and a pressing module for pressing seals of the container, wherein the pressing module comprises a plurality of pressing units disposed on the optical path, and each of the plurality of pressing units is selectively located at a first position blocking the light from reaching the sensor unit and a second position allowing the light to reach the sensor unit; wherein the container comprises a chamber capable of containing a liquid substance and the chamber is sealed;

(b) a pressing step of pressing the sealed chamber with the plurality of pressing units of the seal inspection device for inspecting seals;

(c) a light detection step of detecting light with the sensor unit; and (d) a defect detection step of detecting defects in the container based on the light detected by the sensor unit.

19. The method for inspecting a sealed container of claim 18, wherein the preparation step comprises contacting the plurality of pressing units with the seal of the chamber.

20. The method for inspecting a sealed container of claim 18, wherein, in the light detection step, the sensor unit does not detect the light traveling along the optical path when at least one of the plurality of pressing units is located at the first position, and the sensor unit detects the light traveling along the optical path when all of the plurality of pressing units are located at the second position.

* * * * *